Figure 1:
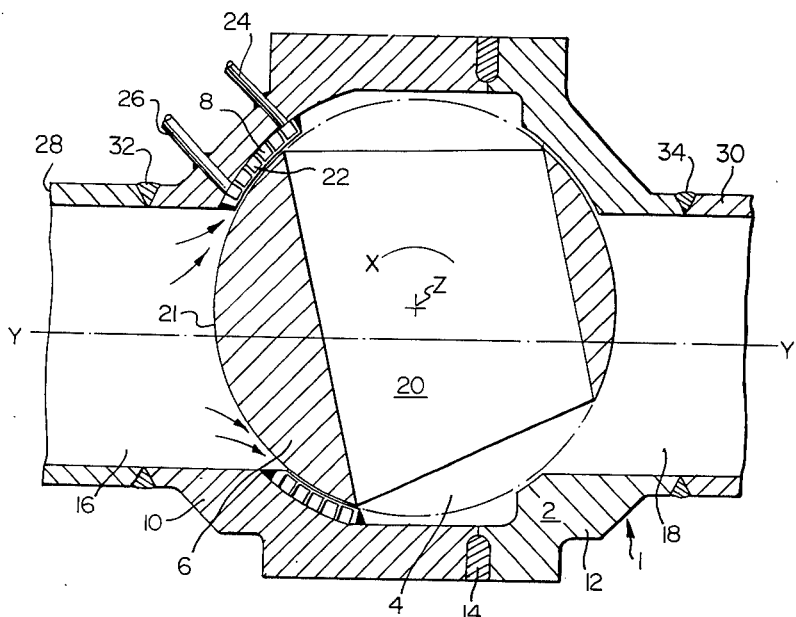

United States Patent [19]
Sharp et al.

[11] 3,877,481
[45] Apr. 15, 1975

[54] VALVE ASSEMBLY

[75] Inventors: Frederick L. Sharp; Valentino S. Cecco, both of Deep River, Ontario, Canada

[73] Assignee: Atomic Energy of Canada Limited, Ottawa, Ontario, Canada

[22] Filed: Apr. 30, 1973

[21] Appl. No.: 355,414

[30] Foreign Application Priority Data
July 26, 1972  Canada ................................ 147991

[52] U.S. Cl. .................................. 137/340; 277/22
[51] Int. Cl. ......................... F16k 5/06; F16k 49/00
[58] Field of Search ....... 251/315; 137/340; 277/22, 277/26, 135

[56] References Cited
UNITED STATES PATENTS

| | | | |
|---|---|---|---|
| 2,073,481 | 3/1973 | Kinzie ........................... | 137/340 UX |
| 2,646,065 | 7/1953 | Tyson .............................. | 137/340 X |
| 2,799,522 | 7/1957 | King et al. ........................ | 277/22 X |
| 3,028,874 | 4/1962 | Burkett ............................. | 137/340 |
| 3,158,172 | 11/1964 | Giovannetti et al. ............... | 137/340 |
| 3,286,981 | 11/1966 | Brice ................................. | 251/315 |
| 3,428,089 | 2/1969 | Kachergis ..................... | 251/315 UX |
| 3,554,558 | 1/1971 | Rajakovics .......................... | 277/135 |
| 3,647,344 | 3/1972 | Skibo et al. ..................... | 137/340 X |

Primary Examiner—Henry T. Klinksiek
Attorney, Agent, or Firm—Francis W. Lemon

[57] ABSTRACT

A valve assembly comprising, for example, a ball valve rotatably mounted in a casing containing a cooling coil round the casing inlet to freeze seal the ball valve in the closed position. The ball preferably rotates off-centre of a fluid passage through the casing, and has an off-centre fluid passage so that access is provided for ice expansion should liquid in the casing become completely frozen. The valve is opened by first melting the ice seal.

1 Claim, 3 Drawing Figures

VALVE ASSEMBLY

This invention relates to a valve assembly.

There are instances, such as isolation valves in nuclear power stations, where a valve assembly is not used very often, but when it is used it is essential that there is no leakage of fuel. Furthermore, these valve assemblies are often required to be locked in the closed position against being opened inadvertently.

It is an object of the present invention to provide a valve assembly which is leak-proof and locked when closed.

According to the present invention there is provided a valve assembly, comprising a casing having a fluid passage, a valve closure member mounted in the casing, for closing the fluid passage therein, refrigerant conveying conduit means for freezing fluid as a leak-proof seal and lock between the closure member and the casing when the closure member is in the closed position, and actuating means for moving the closure member between the open and closed positions.

The valve closure member may be rotatably mounted in the casing, for rotation to and from the closed position to the open position, between inlet and outlet portions of the fluid passage, and the refrigerant conveying means may be a heat exchange conduit in the casing and around one of said portions of the fluid passage.

More particularly the above mentioned conduit is preferably around the inlet portion of the fluid passage.

Figure 2:
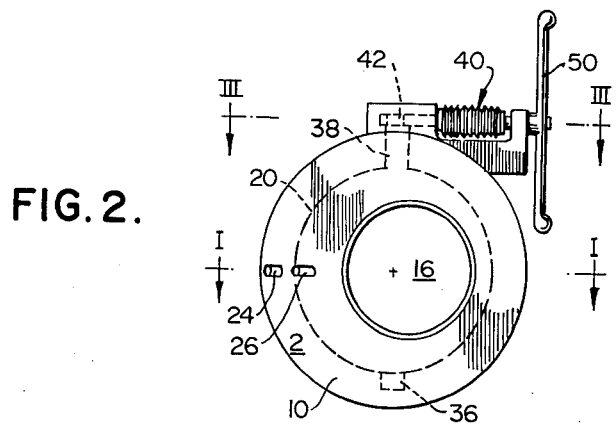
Figure 3:
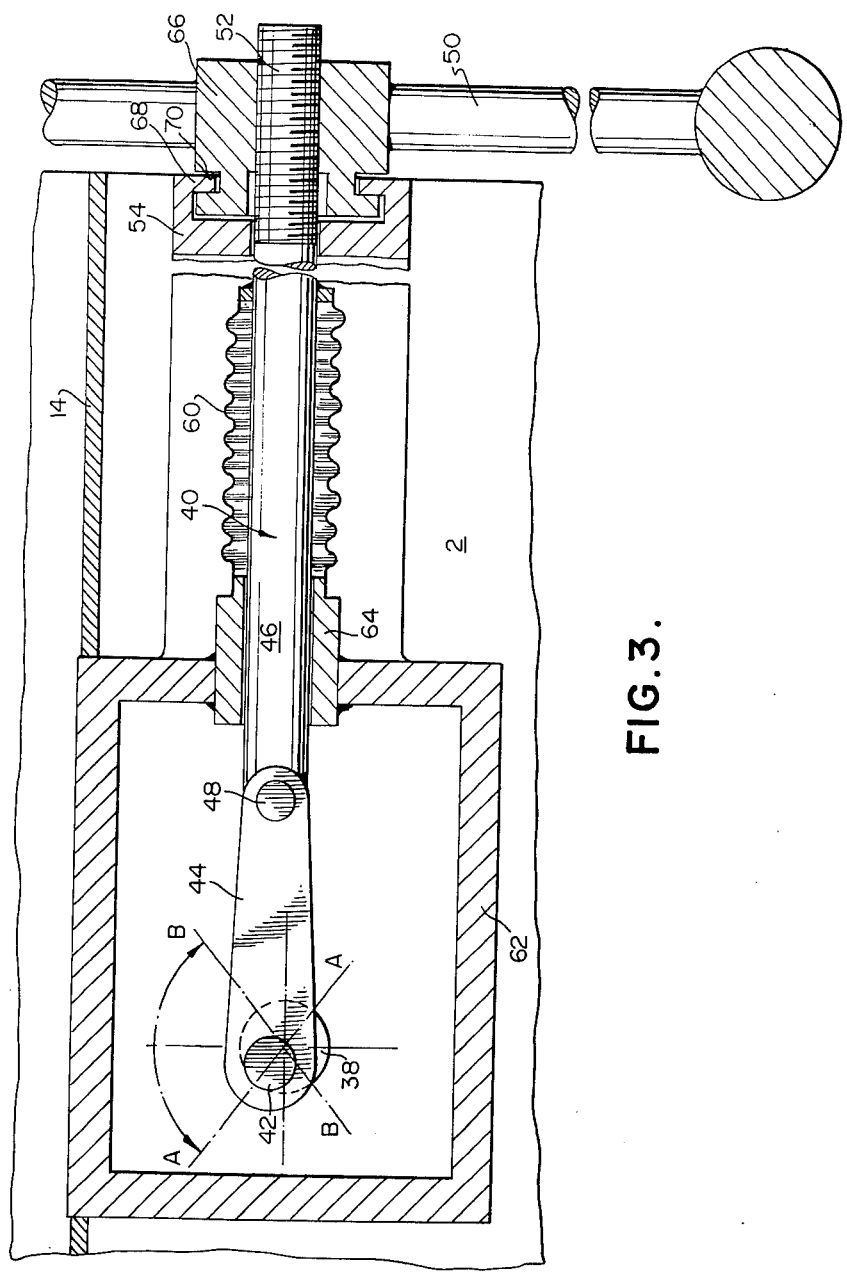

In the accompanying drawings which illustrate, by way of example, an embodiment of the present invention:

FIG. 1 is a sectional plan view along I—I, FIG. 2 of a ball type valve assembly with the valve ball in the closed position, FIG. 2 is a side view at a smaller scale than, and of, the valve shown in FIG. 1, with the valve ball in the open position, and FIG. 3 is an enlarged, partly sectioned plan view along III—III, FIG. 2 of the valve actuating means.

Referring to FIG. 1, a valve assembly 1 has a casing 2 having a fluid passage 4, a valve closure member 6 for closing the fluid passage 4, and refrigerant conveying conduit means 8 for freezing fluid as a leak-proof seal and lock between the closure member 6 and the casing 2 when the closure member 6 is in the closed position.

The casing 2 comprises two halves 10 and 12 joined by a seam weld 14. The fluid passage 4 has inlet portion 16 and outlet portion 18.

The closure member 6 is a valve ball having a fluid passage 20 which is off-centre in a direction way from a sealing surface 21 thereof and is rotatably mounted in the casing 3, for rotational movement in the direction of arrow X about the axis Z which is off-centre in a transverse direction with respect to the longitudinal axis YY of the fluid passage to align the closure member fluid passage 20 with casing fluid passages 16 and 18 when the valve is open, and to position the sealing surface 21 adjacent to refrigerant conveying conduit means 8. The closure member 6 is mounted off-centre to the longitudinal axis YY of the fluid passage 4 so that when rotated about the off-centre axis Z by means to be described later, the alignment the off-centre fluid passage 20 with respect to the longitudinal axis YY of the fluid passage 4 is effected.

The refrigerant conveying conduit means 8 comprises a helical tube 22 having an inlet 24 and an outlet 26.

In this embodiment the casing 2 is welded to two water pipes 28 and 30 by welds 32 and 34 respectively.

Referring to FIGS. 2 and 3, the closure member 6 is rotatably mounted in the casing 2 by means of stub axles 36 and 38 fixedly secured to the closure member 6 to rotate therewith. An actuating means generally designated 40 is mounted on the casing 2, for moving the closure member 6 between the open and closed positions. The actuating means 40 is pivotally connected to the closure member 6 by a crank pin 42.

The actuating means 40 comprises a link 44 pivotally attached to the crank pin 42, a spindle 46 pivotally attached to the link 44 by pivot 48, a screw threaded handwheel 50 in threaded engagement with a threaded portion 52 of the spindle 46, a bracket 54 rotatably securing the handwheel 50 in position on the casing 2, and a bellows 60 sealing the spindle 46 to the casing 2. The spindle 46 is slidably located in the bracket 54.

The link 44 is enclosed in a box-like extension 62 of the casing 2. The spindle 46 is held against rotation about its longitudinal axis by link 44, and is slidable longitudinally in the bracket 54 and in a bearing 64 in the wall of the box-line extension 62. The handwheel 50 is screw threaded in a box 66, and the bracket 54 rotatably secures the handwheel 50 by an inturned rim 68 on the bracket 54 locating in an annular slot 70 in the box 66. The bellows 60 is welded to the bearing 64 and to the spindle 46.

In operation the valve assembly 1 is arranged as shown in FIGS. 1 to 3, with refrigerant inlet 24 connected to a source of alcohol, cooled by solid carbon dioxide, as the refrigerant. With the valve closure member 6 in the closed position as shown in FIG. 1, the cooled alcohol is circulated through the helical tube 22 to the outlet 26 to freeze water into ice between the sealing surface 21 of the closure member 6 and the casing 2. The ice formed between the sealing surface 21 and the closure member 6 forms a leak-proof seal and locks the closure member 6 to the casing 2, thus preventing the valve from being opened inadvertently.

The closure member 6 being formed as an off-set ball has an advantage in that it provides an access for expansion of ice on the fluid downstream side should liquid become frozen as a filling in the casing 2 and the passage 20. It also has the advantage that the ball diameter: pipe size ratio may be smaller than a conventional on-centre ball.

To open the valve the circulation of the cooled alcohol through the helical tube 22 is stopped to allow the ice between the sealing surface 21 and the casing 2 to melt. It has been found that the ice melts quickly once the circulation of the cooled alcohol through the helical tube 22 is stopped. Then the valve closure member 6 is rotated by turning the handwheel 50 to align the passage 20 with the axis YY. When the handwheel 50 is turned the threaded portion is drawn to the right (FIG. 3) into the bore 66 thus pulling the crank pin 42 through an arc from AA to BB, at which position the valve is open.

As an indication of the size of gap between the closure member 6 and the helical tube, a gap of 0.01 inches was found to be acceptable for an eighteen inch ball, however the gap is preferably as small as is practically possible.

will be appreciated that the refrigerant conveying conduit means 8 may, in other embodiments, be situated around the fluid outlet portion 18, and the end portion 34 sealed against the outlet end of the casing The invention is also useful for other known types of valves, such as cocks, wedge-gate valves, double-disk gate valves, swing-check valves or gate valves.

Other refrigerants may be used, for example, liquid nitrogen could be used as the refrigerant where the thermal stresses involved can be tolerated using this refrigerant.

It will be appreciated that other forms of actuating means may be used, for example, the actuating means may be driven by an electric motor.

We claim:
1. A valve assembly, comprising a casing having a fluid passage with an inlet portion and an outlet portion, a valve closure member mounted in the casing for closing the fluid passage therein, a heat exchange conduit in the casing and around a portion of the casing fluid passage adjacent an upstream side of the valve closure member, for freezing fluid as a leak-proof seal and lock between the closure member and the casing when the closure member is in the closed position, and actuating means for moving the closure member between the open and closed positions, and wherein the improvement comprises the valve closure member is a valve ball having a fluid passage off-center in a direction away from and downstream of a sealing surface thereof when the valve ball is in the closed position, and the valve ball is rotatably mounted in the casing about an axis which is off-center in a transverse direction with respect to the longitudinal axis of the inlet and outlet portions of the fluid passage, to align the valve ball fluid passage with the casing fluid passage when the valve ball is in the open position, and to position the fluid passage sealing surface adjacent the heat exchange conduit when the valve ball is in the closed position.

* * * * *

UNITED STATES PATENT OFFICE
CERTIFICATE OF CORRECTION

Patent No. 3,877,481           Dated  April 15, 1975

Inventor(s)  Frederick L. Sharp et al.

It is certified that error appears in the above-identified patent and that said Letters Patent are hereby corrected as shown below:

Column 3, lines 1 to 21, should appear as shown below:

-- It will be appreciated that the refrigerant conveying conduit means 8 may, in other embodiments, be situated around the fluid outlet portion 18, and the end portion 34 sealed against the outlet end of the casing 2.

The invention is also useful for other known types of valves, such as cocks, wedge-gate valves, double-- disk gate valves, swing-check valves or gate valves.

Other refrigerants may be used, for example, liquid nitrogen could be used as the refrigerant where the thermal stresses involved can be tolerated using this refrigerant.

It will be appreciated that other forms of actuating means may be used, for example, the actuating means may be driven by an electric motor.

UNITED STATES PATENT OFFICE
CERTIFICATE OF CORRECTION

Patent No. 3,877,481    Dated April 15, 1975

Inventor(s) Frederick L. Sharp et al.

It is certified that error appears in the above-identified patent and that said Letters Patent are hereby corrected as shown below:

We claim:

1. A valve assembly, comprising a casing having a fluid passage with an inlet portion and an outlet portion, a valve closure member mounted in the casing for closing the fluid passage therein, a heat exchange conduit in the casing and around a portion of the casing --.

Signed and Sealed this fourteenth Day of October 1975

[SEAL]

Attest:

RUTH C. MASON
*Attesting Officer*

C. MARSHALL DANN
*Commissioner of Patents and Trademarks*